(12) United States Patent
Lane

(10) Patent No.: US 6,698,810 B1
(45) Date of Patent: Mar. 2, 2004

(54) TELESCOPING, MULTIFUNCTION TAILGATE EXTENDER

(76) Inventor: David A. M. Lane, 1700 E. Main St., Ashland, OR (US) 97520

( * ) Notice: Subject to any disclaimer, the term of this patent is extended or adjusted under 35 U.S.C. 154(b) by 0 days.

(21) Appl. No.: 10/254,717

(22) Filed: Sep. 23, 2002

(51) Int. Cl.[7] .................................................. B60P 7/15
(52) U.S. Cl. ........................ 296/3; 296/57.1; 296/26.05; 296/26.09; 296/26.02
(58) Field of Search ...................... 296/3, 26.05, 26.02, 296/26.06, 26.08, 26.09, 50, 57.1, 51, 60; 224/405, 484, 495, 500, 502, 533

(56) References Cited

U.S. PATENT DOCUMENTS

| | | | | |
|---|---|---|---|---|
| 4,138,046 A | * | 2/1979 | De Freze | 224/405 |
| 4,630,990 A | * | 12/1986 | Whiting | 414/462 |
| 4,856,686 A | * | 8/1989 | Workentine | 224/497 |
| 5,037,152 A | * | 8/1991 | Hendricks | 296/3 |
| 5,143,415 A | * | 9/1992 | Boudah | 296/3 |
| 5,219,105 A | * | 6/1993 | Kravitz | 224/511 |
| 5,431,472 A | * | 7/1995 | Coffland | 296/3 |
| 5,439,152 A | * | 8/1995 | Campbell | 224/405 |
| 5,458,389 A | * | 10/1995 | Young | 296/26.08 |
| 5,518,159 A | * | 5/1996 | DeGuevara | 224/488 |
| 5,649,656 A | * | 7/1997 | Davy | 224/405 |
| 5,662,254 A | * | 9/1997 | Lemajeur et al. | 224/405 |
| 5,732,995 A | | 3/1998 | Piccariello | |
| 5,743,583 A | * | 4/1998 | Lowe | 296/3 |
| 5,788,135 A | * | 8/1998 | Janek | 224/527 |
| 5,803,330 A | * | 9/1998 | Stack et al. | 224/518 |
| 5,911,464 A | * | 6/1999 | White | 296/26.11 |
| 5,950,890 A | | 9/1999 | Darby | |
| 6,033,002 A | * | 3/2000 | Clare et al. | 296/3 |
| 6,082,801 A | | 7/2000 | Owen et al. | |
| 6,099,061 A | * | 8/2000 | Gessay | 296/26.08 |
| 6,113,171 A | | 9/2000 | Stearns | |
| 6,227,593 B1 | | 5/2001 | De Valcourt | |
| 6,340,190 B1 | | 1/2002 | Rosebrugh et al. | |
| 6,364,392 B1 | | 4/2002 | Meinke | |
| 6,378,926 B1 | | 4/2002 | Renze et al. | |
| 6,401,999 B1 | * | 6/2002 | Hehr | 224/502 |
| 6,402,215 B1 | | 6/2002 | Leitner et al. | |
| 6,425,618 B1 | * | 7/2002 | Garland et al. | 296/3 |

OTHER PUBLICATIONS

U. S. patent application Ser. No. 10/096,103, Lane et al., filed Mar. 11, 2002.

* cited by examiner

*Primary Examiner*—D. Glenn Dayoan
*Assistant Examiner*—Gregory Blankenship

(57) ABSTRACT

The subject of the current invention is an eight-functions-in-one truck tailgate extender. It consists of a load-carrying member positioned parallel to and proximate the upper edge of a truck tailgate with one or more telescoping assemblies connecting the load-carrying member to either the tailgate or to the truck body. Depending on the degree of extension of the telescoping assemblies, the load-carrying member may be resting on or near the top of the tailgate, or it may be extended at various lengths up to the full extension of the telescoping assemblies. A locking mechanism between the individual elements of the telescoping assemblies allows the load-carrying member to be affixed at varying distances away from the top of the tailgate. Further, the load-carrying member has a plurality of holes, or other suitable means along its length, to serve as tie-down points for various width loads. The load-carrying member can also be fitted with one or more horizontal, elongate members which serve as a bicycle rack. The load-carrying member can also serve as an attachment point for a ski rack or other specialized racks.

18 Claims, 5 Drawing Sheets

TELESCOPING, MULTIFUNCTION TAILGATE EXTENDER

FIELD OF THE INVENTION

This invention relates to a telescoping, truck tailgate extension which can be utilized in seven different configurations for eight different functions.

BACKGROUND OF THE INVENTION

Pickup trucks have long been known for their capability of transporting a wide variety of objects. However, there are at least seven problems associated with conventional pickup truck design which the current invention solves. Pickup beds come in a variety of lengths, from just 125 cm (50") for the Ford Explorer Sport Trac, up to 245 cm (96") for the Ford F350 Super Duty. Many pickup truck beds are in the 180–200 cm (70"–80") range which means that loads which exceed the bed length, such as 245 cm (8') lumber, are typically carried by placing one end on the floor of the truck bed nearest the cab and placing the other end on either the upper edge of the closed tailgate, or on the opened tailgate. Tailgate heights vary from approximately 40 cm (16") up to about 50 cm (20"), with the majority being approximately 50 cm (20"). For convenience, the term "tailgate height" will be used to denote both the height of the tailgate in the closed or vertical position, as well as, the added bed length when the tailgate is in the open or horizontal position. When the tailgate is lowered to its horizontal position, this typically adds approximately 50 cm (20") to the bed length, more than enough to accommodate 245 cm (8') loads in standard beds of 180–200 cm (70"to 80"). Unfortunately, tailgates uniformly have no tie-down points which makes securing the load, in either the closed/upright or open/horizontal position, very difficult. This constitutes a major safety hazard when carrying loads longer then the bed of the truck (Problem #1).

The inability to secure cargo against a closed truck tailgate contributes to scratching and denting the upper edge of the tailgate as cargo slides back and forth or bounces up and down as the truck navigates curves and bumps (Problem #2).

Regardless of the size of the truck bed, there will always be a load longer than the bed (Problem #3). Consider trying to carry a 395 cm (13') canoe in a standard 200 cm (80") truck bed: even with the 50 cm (20") tailgate lowered, 145 cm (56") of the canoe would still have no support, posing a potential safety hazard. This problem is compounded for the new, shorter beds of the sport utility trucks, and for the crew and king cab designs.

A fourth problem with pickups is their limited capability to safely transport bicycles. Consider a party of 4 going for a day of mountain biking—these bikes average 175 cm (68") in length, so 4 of them laying on their sides, partially on top of each other, would take up most of the cargo area in a standard sized pickup bed, no less in a short bed of only 125 cm (50"). Additionally, with no way to secure the bikes, they would be free to rub against each other and against the pickup bed, scratching both the bikes and the bed. To free up bed space and to safely carry the bikes, the truck owner would need to purchase a separate, added-cost bike rack.

A fifth problem with pickup trucks is their limited capability to safely transport skis. The newer sport trucks are designed to transport both people and equipment to a variety of sporting activities, including skiing. Skis range in length from under 120 cm (4 ft.) for children's skis to over 185 cm (6 ft) for cross country skis. While these lengths can be carried within the bed of most pickups, there is no way to secure the skis, so they would be free to slide about, scratching both the skis and the pickup bed. This would be especially true when the pickup is negotiating twisty mountain roads to get to a ski area. To free up bed space and to safely carry skis, the truck owner would need to purchase a separate, added-cost ski rack.

A sixth problem with pickup trucks is the fact that to carry loads at roof-top height the owner must purchase a separate rack system, frequently called a lumber rack or contractor's rack, which is usually permanently installed. These racks are expensive and have limited value to the average truck owner who is not hauling construction materials on a regular basis. Some truck owners attempt to carry long loads supported between the top of the closed tailgate and the rear of the truck cab roof. With only a few tie-down points to secure the cargo, this practice is particularly unsafe.

A seventh problem with pickup trucks is their limited capability to safely transport tall items which cannot be laid down in the truck bed, e.g., a refrigerator or bookcase. The truck, as it comes from the factory, has few, if any, tie-down points and has no vertical support for items taller than the bed height—usually about 40–50 cm (16"–20").

BACKGROUND—DESCRIPTION OF PRIOR ART

There are a variety of previous inventions which have sought to solve one or more of the above seven problems with only limited success. There are a number of inventions which are called bed extenders which place some sort of barrier or gate at the end of the lowered tailgate, including Leitner, et al., U.S. Pat. No. 6,402,215, Renze, et al., U.S. Pat. No. 6,378,926, Rosebrugh, et al., U.S. Pat. 6,340,190, and De Valcourt, U.S. Pat. No. 6,227,593. All of these extend the usable bed space only to the end of a lowered tailgate. This accomplishes little of value over the simple expedient of lowering the tailgate. Further, all of these designs limit the length of materials that can be carried since nothing can extend over the end of the tailgate—longer items would have to be propped up over the edge of the gate which accomplishes little more than resting the items on the edge of the closed tailgate. Further, none of these designs solve the seven problems noted above. Leitner's, DeValcourt's and Rosebrugh's designs could be used to tie down cargo which was propped up on the top of their bed extenders, but none of them claim nor teach this as a benefit of their individual designs.

Stearns, U.S. Pat. No. 6,113,171, Owen, et al., U.S. Pat. No. 6,082,801, and Piccariello, U.S. Pat. No. 5,732,995 have all designed tailgate extensions which effectively lengthen the tailgate to nearly twice its height. Thus, when the tailgate is lowered and the extender is extended to its full length, the effective length of the pickup bed is lengthened by nearly twice the height of the tailgate. In practice, this would be approximately 100 cm (40") longer then the actual bed. Even though these designs allow somewhat longer loads to be carried, none of them solve the seven problems noted above. Likewise, neither Piccariello nor Stearns solve the problem of being able to safely tie down the cargo. By the very nature of their design, Owen, et al., provide a structure which can be used for tying down cargo, however Owen, et al., make no such claim and do not teach this as an advantage of their design.

Both Piccariello and Owen, et al., illustrate their extensions in the vertical position (FIG. 3 in each patent), however neither teaches us much about the function of this position. Piccariello states, "The increased height now afforded the tailgate being suitable to now properly accommodate the load, whether it be a situation in which the tailgate is in the down or the up position." "Accordingly, it is an object of the present invention to provide a tailgate extender wherein the height of a pick-up truck tailgate can be selectively adjusted." (U.S. Pat. No. 5,732,995, Column 2, lines 14–19) Owen, et al., are equally sparse when describing the benefits of having their bed extender extended in the vertical position: "This position provides support for materials that exceed the bed height and prevents taller items from tipping out of the back of the vehicle under transportation." (U.S. Pat. No. 6,082,801, Column 6, lines 20–22) Neither inventor claims nor teaches the possibility that his bed extender, in the vertical position, could be used to support and secure the rear portion of cargo at roof-top height. And, in fact, Piccariello's design has no mechanism to hold his tailgate extender firmly in any position, neither extended nor closed, so it would be impossible for his tailgate extender to be used in the extended, vertical position he shows in his FIG. 3—it would simply slide down into the closed position and stay there.

Meinke, U.S. Pat. No. 6,364,392, has designed a tailgate extender which, in practice, accomplishes very little of value. If Meinke's FIG. 7 is drawn to scale, and if it represents a typical 50 cm (20") tall tailgate, then his Item 34, a bar, can extend only 22 cm (8¾") above the top edge of the tailgate. This is a severe limitation to his design since an extra 22 cm extension, either vertically or horizontally, provides only a minimum increase in cargo capacity. In a typical 180 cm (70") long pickup bed, with a 50 cm (20") tailgate opened, an added 22 cm is only a 10% increase in length—see Meinke's FIG. 3. The additional 22 cm adds virtually nothing to the stability of the lumber which already has its other 90% adequately supported by the pickup bed and tailgate.

Meinke also has little to teach us about another of his proposed functions for his bar: ". . . as seen in FIG. 5, the extender assembly provides a stop to limit and constrain the movement of cargo positioned on the floor of the cargo body." (Column 6, lines 18–20) Unfortunately, Meinke's FIG. 5 shows his extender assembly as providing a stop for only one side of the piece of plywood on the bed floor. The other five pieces of lumber are not restrained in any way by his extender. In essence, his extender does not perform the function he claims.

Further, Meinke, teaches us very little about the value of extending his bar in the vertical position with the tailgate closed: "In this extended position, as seen in FIG. 2, the extender assembly provides additional vertical restraint for cargo within the cargo bed of the vehicle." (Column 5, lines 49–51) Unfortunately, an additional 22 cm in height adds little to the vertical stability of tall cargo.

Meinke clearly did not anticipate any design which would allow his bar to be raised further than the 22 cm he shows in FIG. 7. In his Claims 1 and 2, he describes "a pair of vertical post assemblies . . . each post assembly including a lower post member articulated to an upper post member connected to the bar . . . each post assembly further includes a vertical guide tube mounted in the tailgate; and each lower post is slidably mounted in the respective guide tube." (Column 7, lines 25–44). He uses no language which would indicate any alternatives or any other configuration, and, he states: "This fully upwardly extended position is also defined by engagement of the stop members 68 on the lower post members with the upper ends of the slots 38b in the respective guide post." This clearly indicates that Meinke never intended for his bar to be extended any further than the approximately 22 cm he shows in his FIG. 7. In addition, it would be impossible to add additional extension members into his design because of the manner in which his Item 40 lower post member interacts with his Item 42 upper post member, and the manner in which both of these items interact with his Item 52 catch dog. Since Meinke did not conceive of his bar being raised higher than 22 cm, it is no wonder that he makes no claim and does not teach the desirability of using this position to support the rear portion of long cargo when the front portion is supported at roof-top height. Likewise, Meinke makes no claim and does not teach the desirability of using his bar as a tie-down point for securing cargo. Thus, Meinke has patented a complex and expensive design which is virtually useless according to his own description of the operation of his invention. By way of contrast, the current invention, because of its simplicity, would be very economical to produce, and it accomplishes eight different and important functions.

Both Darby, U.S. Pat. No. 5,950,890 and Lane, et. al., U.S. patent application Ser. No. 10/096,013, dated Mar. 11, 2002, show a combination roof rack extender and bed extender. The current invention can perform both of these functions, but since the load-carrying member is supported by two arms, it is inherently stronger and more stable than either Darby's or Lane, et al.'s, designs, which both have only one support arm. Further, the current invention is designed to be either incorporated into the manufacture of the tailgate, or to be a permanently attached as an after market option. Thus, the current invention would be readily available to assist in carrying long and/or bulky loads, whereas both Darby's and Lane, et al.'s, racks must be attached to the vehicle each time they are to be used. This gives the current invention a major advantage in convenience over the other two designs. While the current invention can be used to provide support to tall objects which are carried on the bed of a truck with a tailgate, neither Darby's nor Lane, et al.'s, rack can perform this function. Further, Lane, et al., claim that their rack can also be used as a bike rack and can serve as an attachment point for an accessory ski rack, very similar to the claims for the current invention, but Lane, et al., would have to attach their "L-shaped member" to the truck's receiver hitch before they could attach either the bike or ski rack. Since the current invention is designed to be a permanent part of the truck, it would always be available, without further time or effort, to have the bike or ski rack easily attached.

It is clear that the current invention would be considered unobvious by a person having ordinary skill in the art of tailgate extender design because:

1. The combination of the uncomplicated design and the multiple functions of the current invention is neither anticipated, nor suggested nor implied in any prior art or combination of prior art.
2. The novelty of the current design produces the new and unexpected result of solving seven real needs, including six important safety problems.
3. The current invention provides a synergism: certainly the multiple functions and practical results of this simple design are much greater than would be expected from the sum of its uncomplicated parts.
4. It solves the long felt, but unsolved need for a means to safely transport objects in a truck with a tailgate when the object extends considerably above or behind the truck bed. Other inventors have attempted to solve this need with only very limited success.

5. It solves the problem of safely transporting bikes and skis while freeing up space in the truck bed. This problem, no less the solution, has not previously been appreciated by other inventors.

SUMMARY OF THE INVENTION WITH OBJECTS

The current invention is directed at solving all seven of the limitations of pickup trucks: 1) no tie-down points on the tailgate which constitutes a major safety hazard when transporting loads longer than the bed of the truck, 2) no protection for the upper edge of the tailgate from scratches and dents, 3) limited capability to safely transport loads considerably longer than the truck bed, 4) limited capability to safely transport bicycles, 5) limited capability to safely transport skis, 6) no capability to carry items at roof-top height without buying a separate rack system, and 7) limited capability to safely transport items considerably taller than the bed height.

It is envisioned that the current invention could be attached to a truck in one of three ways:
1. As shown in FIG. 2, the current invention could be incorporated into the design and manufacture of the tailgate. The lowest segments of the telescoping assemblies could be placed at the outer edges of the tailgate, as shown, or they could be contained wholly within the structure of the tailgate.
2. FIG. 3 shows an alternate attachment means in which the lower portion of the lowest segments of the telescoping assemblies are pivotably attached to the body of the truck. The telescoping assemblies are stabilized in either the vertical or horizontal position by means of spring loaded buttons, or by nuts and bolts, or by other suitable means. The advantage to this embodiment is that the tailgate extender can remain in the vertical, extended position (as it would to support cargo at roof-top height) while allowing the tailgate to be opened for access to the truck bed.
3. FIG. 4 shows an attachment means suitable for an after market rack. In this embodiment, the lowest segments of each of the telescoping assemblies are attached by clamps and screws (not shown), or other suitable means, to the inner face of the tailgate. To allow for tailgates of various widths, the load-carrying member is constructed of several segments which slide together and can be firmly affixed to each other at any desired length.

The subject of the current invention is an eight-functions-in-one tailgate extender. It consists of a load-carrying member positioned parallel to and proximate the upper edge of a truck tailgate with one or more telescoping assemblies connecting the load-carrying member to either the tailgate or to the truck body. Depending on the degree of extension of the telescoping assemblies, the load-carrying member may be resting on or near the top of the tailgate, or it may be extended at various lengths up to the full extension of the telescoping assemblies, which, for practical purposes, would be approximately 100 cm (40") beyond the top of the tailgate. A locking mechanism between the individual elements of the telescoping assemblies allows the load-carrying member to be affixed at varying distances away from the top of the tailgate. Further, the load-carrying member has a plurality of holes, or other suitable means, along its length to serve as tie-down points for various width loads. The load-carrying member can also be fitted with one or more horizontal, elongate members which serve as a bicycle rack. The load-carrying member can also serve as an attachment point for a ski rack or other specialized racks, e.g., a kayak saddle. Since pickup trucks do not have other suitable attachment points for racks (unless the owner purchases a receiver trailer hitch), this is an important improvement over prior art.

When the tailgate extender is in the vertical position, the load-carrying member can function in six separate ways. It can:
1. Serve as a tie-down point to safely transport cargo which extends over the edge of the tailgate, e.g., lumber which is longer than the truck's bed. This use would typically occur with the load-carrying member in its lowest position proximate the top of the tailgate, and with loads only about 30–90 cm (1'–3') longer than the truck bed.
2. Protect the upper edge of the tailgate from scratches and dents.
3. Serve as the attachment point for two horizontal, elongate members which can be used as a bike rack. The height of the load-carrying member can be adjusted to allow the bicycles to be carried safely, while freeing up bed space for other cargo.
4. Serve as the attachment point for a dedicated bicycle rack, a ski rack, or other specialized rack, e.g., a kayak saddle. This greatly increases safety when transporting these items, while freeing up bed space for other cargo.
5. Be extended to a height approximately equal to a roof rack or a "headache rack" (a rack which is positioned proximate to the front end of the truck bed and extending slightly above the height of the cab). In this position, long loads, e.g., a canoe, can safely be carried between the load-carrying member at the rear of the truck and either a roof rack or a headache rack. Likewise, loads which are too wide to lay flat on the floor of the truck bed, e.g., sheet goods like plywood, can be safely carried between the load-carrying member at the rear of the truck and either a roof rack or a headache rack.
6. Serve as a vertical support and tie-down point for tall cargo which cannot safely be laid down in the truck bed, e.g., a refrigerator or bookcase. With the telescoping assemblies fully extended, the load-carrying member would be approximately 150 cm (5') above the bed surface. This provides a major improvement in safety when transporting tall objects.

When both the tailgate and the tailgate extender are in the lowered or horizontal position, the load-carrying member can be used in two ways. It can:
1. Serve as a tie-down point for cargo which extends over the edge of the lowered tailgate, e.g., lumber which is somewhat longer than both the truck's bed and the tailgate. This greatly improves safety when transporting such loads.
2. Be extended to varying lengths up to its full extension to safely support loads which are considerably longer than the combined length of both the truck bed and the lowered tailgate. In practice, if the truck bed were 180 cm (70") long and the tailgate were 50 cm (20") long, the tailgate extender could be extended an additional 100 cm (40"), for a total of 330 cm, or nearly 11 feet. Since the load could extend beyond the end of the tailgate extender, lumber or other loads of 4.25 m to 4.6 m (14' to 15') could safely be carried in this manner. Of course, in this position, the tailgate extender could serve not only to support the load, but also as a tie-down point.

Thus, the tailgate extender of the current invention can serve the above eight distinct functions.

The general object of the current invention is to provide a new, multi-purpose truck tailgate extender which greatly improves safety when transporting long or bulky cargo.

A specific object of the invention is to provide a tailgate extender which can be extended in multiple increments beyond the top edge of a tailgate.

Another specific object of the invention is to provide a tailgate extender which has multiple tie-down points for securing loads which rest on it.

Another specific object of the invention is to provide a tailgate extender which protects the upper edge of the tailgate from scratches and dents.

Another specific object of the invention is to provide a tailgate extender which can be used to safely transport loads considerably longer than the truck's bed.

Another specific object of the invention is to provide a tailgate extender which can be used to safely transport bicycles while freeing up bed space for other cargo.

Another specific object of the invention is to provide a tailgate extender which can serve as an attachment point for specialized racks, e.g., a ski rack or kayak saddle, while freeing up bed space for other cargo.

Yet, another specific object of the invention is to provide a tailgate extender which can be used to safely support the rear portion of cargo carried at roof-top height.

Yet, another specific object of the invention is to provide a tailgate extender which can be used to safely support and secure tall cargo in a truck bed.

Yet, another specific object of the invention is to provide a tailgate extender which can be attached to either a truck body or a truck tailgate.

Yet, another specific object of the invention is to provide a tailgate extender which will be applicable to both an original equipment manufacturer (OEM) and to an after market manufacturer.

Further objects and advantages of the current invention will become apparent from a consideration of the drawings and ensuing descriptions.

DESCRIPTION OF THE PREFERRED EMBODIMENT

Figure 1:
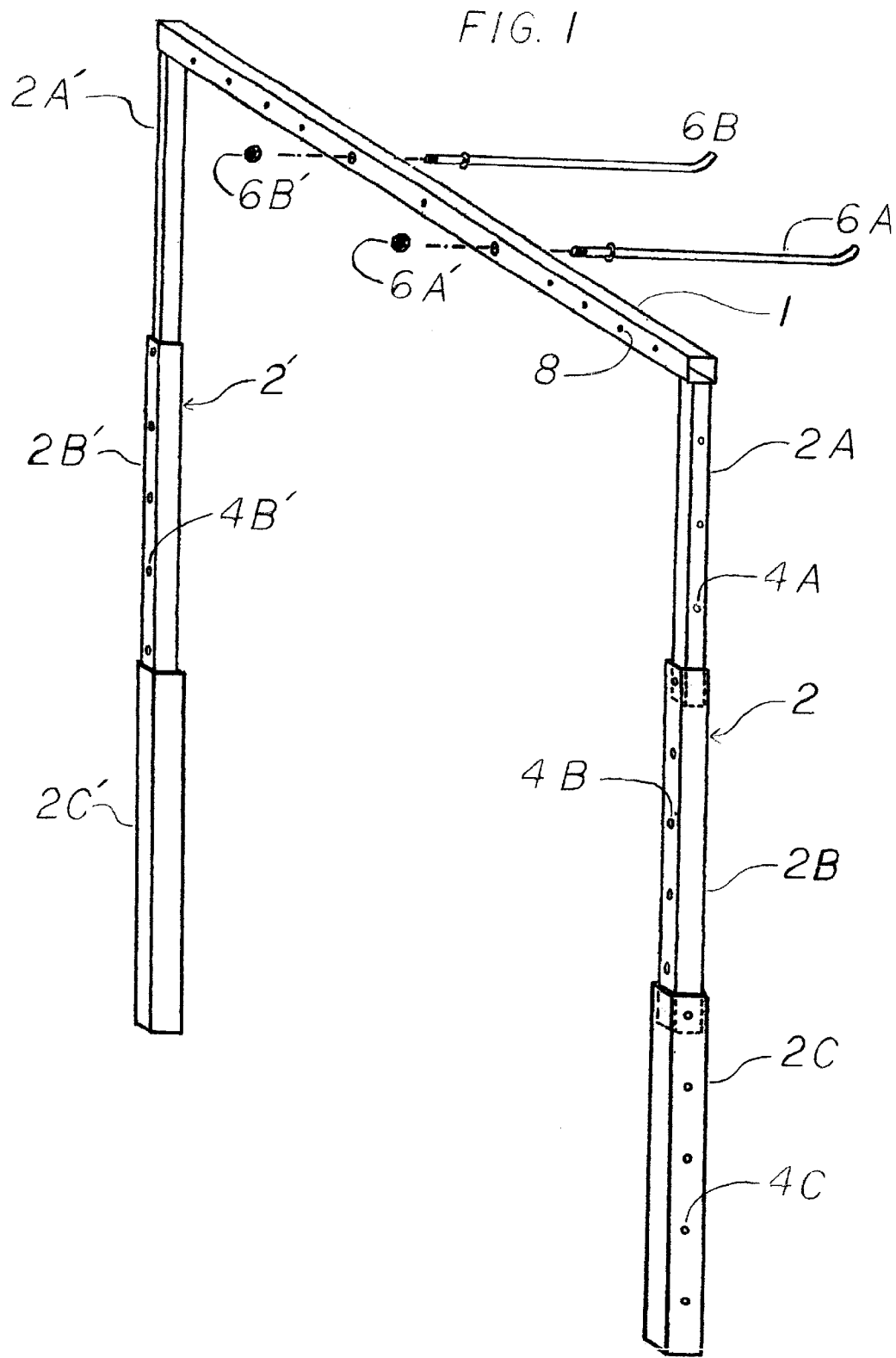
FIG. 1 is a partially exploded isometric view of the tailgate extender in its fully extended, vertical position, as viewed from the truck bed side.

FIG. 1 displays the tailgate extender in its fully extended position, as viewed from the truck bed side, disposed in a vertical direction. Item 1 is the load-carrying member. It is firmly attached to the top segments, Items 2A and 2A', of the two telescoping assemblies. Each telescoping assembly, Items 2 and 2', is composed of 3 segments: Items 2A, 2B and 2C, and Items 2A', 2B' and 2C', respectively. It is possible to have more or fewer than three segments for a particular design. Each segment has holes on one or more sides: Items 4A, 4B and 4C, and 4B' (holes 4A' and 4C' are not shown). These holes serve as both tie-down points for cargo strap hooks, and as interconnection points between the several segments of the telescoping assemblies. In the preferred embodiment, the lower end of segments 2A and 2B, and 2A' and 2B', would be fitted with a spring loaded metal button (not shown), protruding through the lowest hole in each segment. These buttons could be manually depressed to allow each segment to slide inside the next larger/lower segment. For example, the button on the lower end of segment 2B could be depressed to allow segment 2B to slide inside of segment 2C. The spring loaded button could be allowed to protrude through any of the holes, 4C in segment 2C, to firmly fix the extension of segment 2B at any desired height in relation to segment 2C. By adjusting each of the buttons into the desired hole, the load-carrying member could be adjusted from a position just above the tailgate's upper edge, all the way up to the extender's full extension, which, in practice, would be about 100 cm (40"). These adjustments in height would be more easily accomplished with the tailgate extension in the horizontal position. Horizontally matching buttons, e.g., those at the lower ends of segments 2B and 2B', could be manipulated simultaneously. Alternately, taking advantage of the small amount of play between the individual segments, the buttons could be operated serially, first one side and then the other.

While holes and spring loaded metal buttons are proposed for the preferred embodiment, other attachment means, e.g., nuts and bolts, could also be used to affix one segment to another. Likewise, while a manual method of adjusting the height of the telescoping assemblies is described, electric or hydraulic, or other suitable means could also be utilized. Item 1, the load-carrying member, has a multiplicity of holes, Items 8, in it to serve as tie-down points for cargo strap hooks. It also has two somewhat larger holes through which schematic rods, Items 6A and 6B, can be inserted and affixed to the load-carrying member by nuts 6A' and 6B'. These rods extend backwards, away from the rear of the truck. The schematic rods, as shown, are representative of any number of configurations of rods which could serve as a bicycle rack. These same holes, and/or rods, could also serve as the attachment points for any other specialized racks, e.g., a ski rack or kayak saddle. Of course, these rods and other specialty racks could be affixed to the load-carrying member by a variety means. Also, other tie-down means could be substituted for holes 8.

Figure 2:
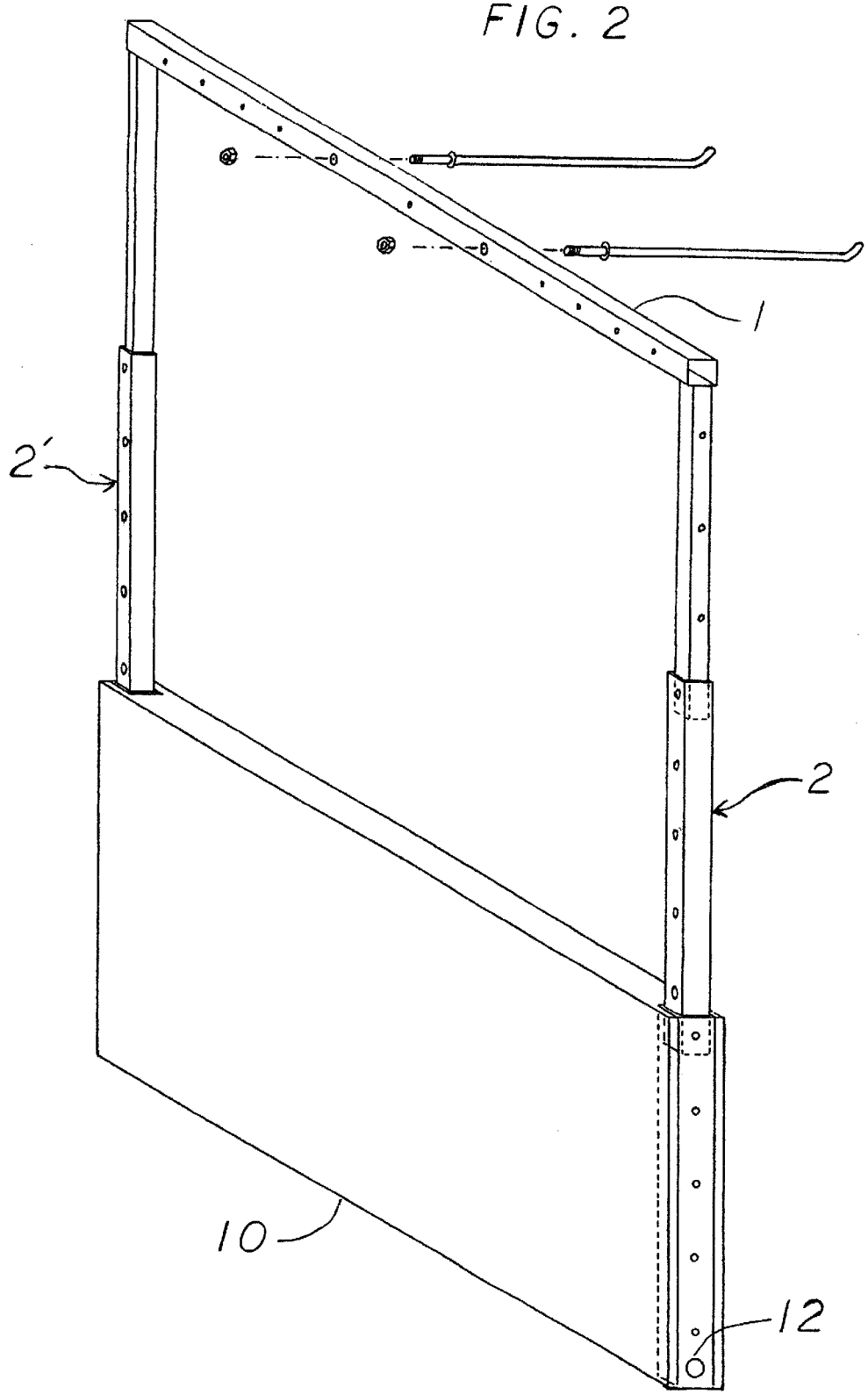
FIG. 2 is a partially exploded isometric view of the tailgate extender in its fully extended, vertical position, as viewed from the truck bed side, as it might appear if manufactured as part of the tailgate.

FIG. 2 shows the tailgate extender attached to a schematic tailgate, Item 10, in the vertical position, as viewed from the bed side of the truck. In this configuration, it is envisioned that the current invention would be designed and manufactured as part of a new truck. It could also be incorporated into an after market tailgate. While not shown, the load-carrying member could be incorporated into the design of the upper edge of a tailgate, rather than being separate from it. Item 12 is the hinge point where the tailgate pivotably attaches to the truck body. With the tailgate in the vertical or closed position and the load-carrying member at its lowest position, it would protect the upper edge of the tailgate from scratches and dents. It could also serve as the tie-down point for cargo which would otherwise be propped up on top of the tailgate, e.g., lumber longer than the truck bed. Securing such a load is an important safety issue which is either not addressed, or only poorly addressed by current truck design. This is an important, non-obvious improvement of the current design over all previous designs.

With the tailgate in the vertical or closed position, the load-carrying member could be raised to approximately the height of either a headache rack or a roof rack. In this configuration, it could support and serve as a tie-down point for the rear half of long cargo.

In the vertical position, with the tailgate closed, the tailgate extender can also serve as a vertical support and tie-down point for tall cargo, e.g., a bookcase or sideboard.

Figure 3:
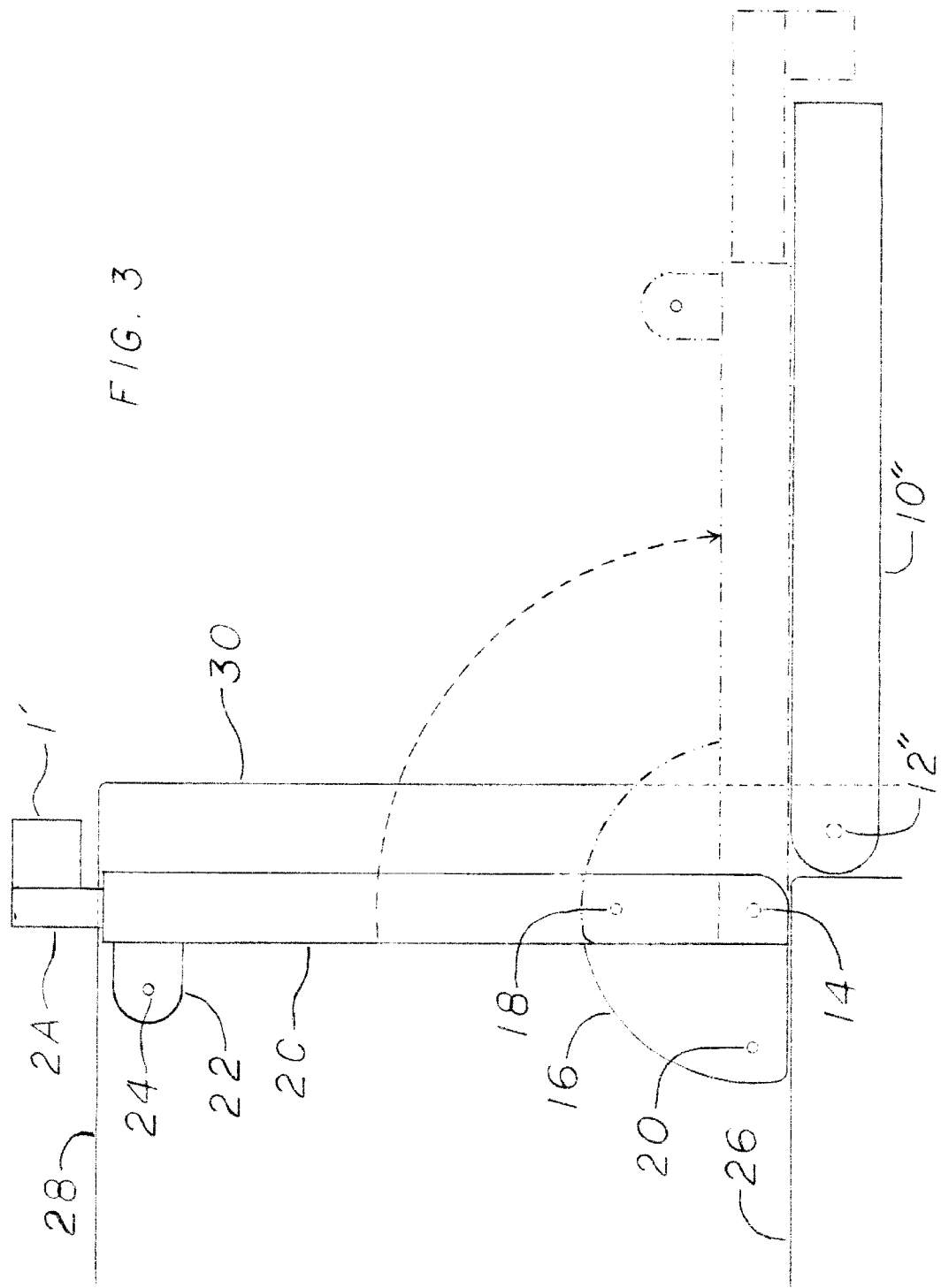
FIG. 3 is a plane view of an alternate mounting of the tailgate extender as it might appear if manufactured as part of the truck.

FIG. 3 shows an alternate attachment of the tailgate extender to a truck body. In this configuration, the truck tailgate can be lowered/opened without lowering the extender. Thus, if the extender is being used as the rear portion of roof rack, the tailgate can be opened without having to remove the cargo from the load-carrying member. Item 10" is the lowered tailgate. Item 26 is the bed of the truck and Item 28 is the upper edge of the truck body. Item 30 is the rear of the truck body where the tail light is placed. In this configuration, the load-carrying member, Item 1', is attached to the side of the top segment of the telescoping assemblies, Item 2A (and 2A', not shown), so that its load-carrying surface approximates the same plane as the lowered tailgate. Item 2C, the lowest segment of the telescoping assembly, is pivotably attached to the sidewall of the truck body at hinge point 14. The quarter-round plate, Item 16, is attached to the lower end of segment 2C and has a hole, Item 20, in it. As the telescoping assembly is rotated from the vertical position to the horizontal position, hole 20 rotates in front of a spring loaded button, Item 18. When button 18 extends through hole 20, it keeps the telescoping assembly firmly in the horizontal position. At the top of Item 2C is a small plate, Item 22, with a hole in it, Item 24. Behind hole 24 is a spring loaded button which is attached to the side wall of the truck body. When the button extends through hole 24, it keeps the telescoping assembly firmly in the vertical position. When this button is depressed through hole 24, the telescoping assembly is released and can be rotated from the vertical position into the horizontal position. It is envisioned that this configuration would be designed and manufactured as original equipment, as either standard equipment or as an accessory for a new truck.

Figure 4:
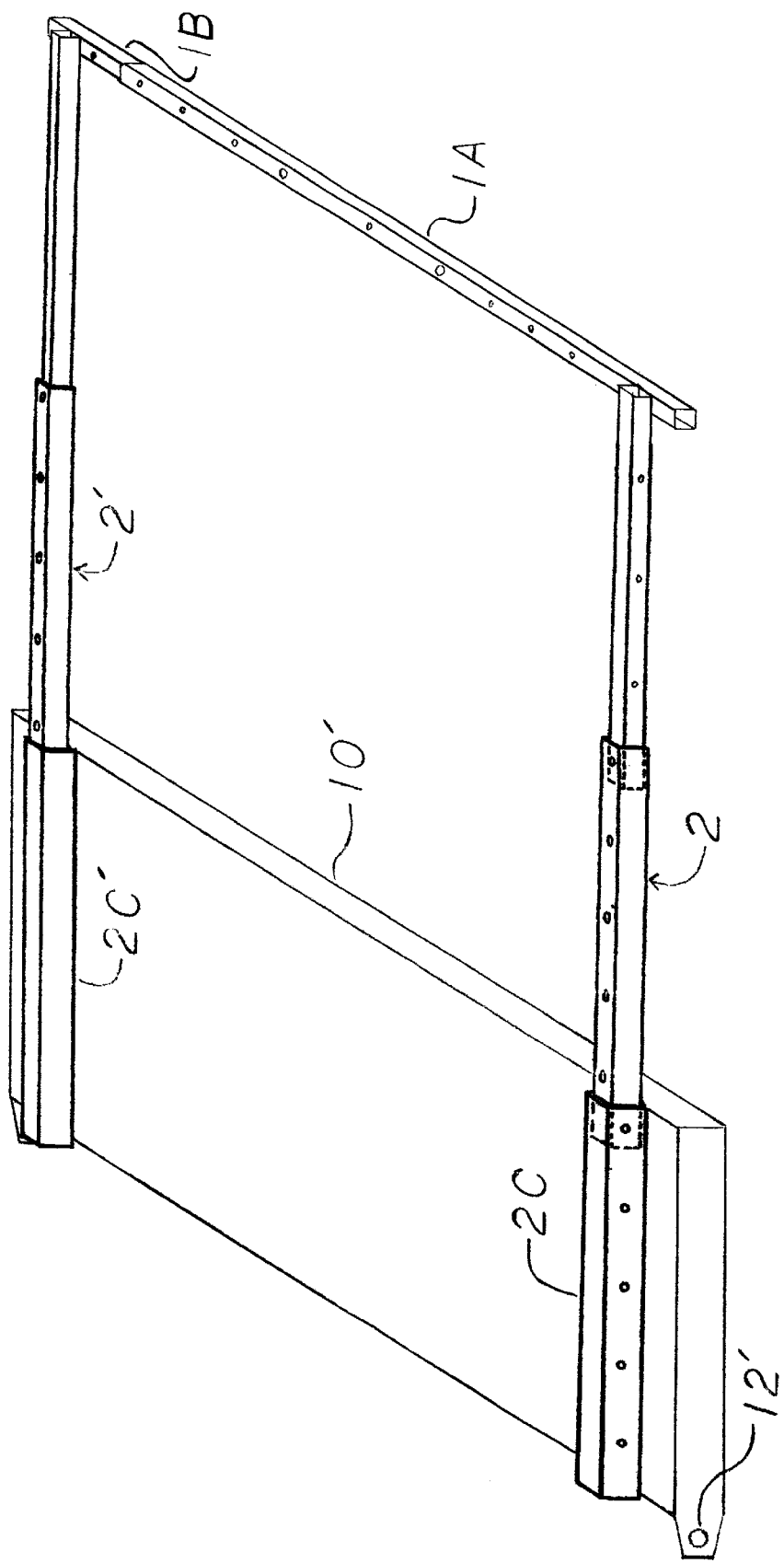
FIG. 4 is an isometric view of the tailgate extender in its fully extended horizontal position as an after market, add-on item.

FIG. 4 shows an after market version of the tailgate extender affixed to a schematic tailgate, Item 10', in the horizontal position. The tailgate is pivotably attached to the truck body at hinge points 12'. Telescoping assembly segments 2C and 2C' would be firmly affixed to the tailgate by any standard means, including straps (not shown) at the upper and lower ends of Items 2C and 2C' which, in turn, would be held in place by screws into the tailgate. The load-carrying member is constructed of two pieces, Items 1A and 1B. Item 1B slides inside Item 1A and can be affixed to Item 1A by any standard means, including a nut and bolt. This allows the length of the load-carrying member to be adjusted according to the width of the tailgate. Just as in FIG. 3, the load-carrying member is attached to the sides of Items 2A and 2A' so that its load-carrying surface more nearly approximates the plane of the horizontal tailgate. In the horizontal position, the tailgate extender can serve as both a support and as a tie-down point for cargo considerably longer than the truck bed, e.g., a canoe.

Figure 5:
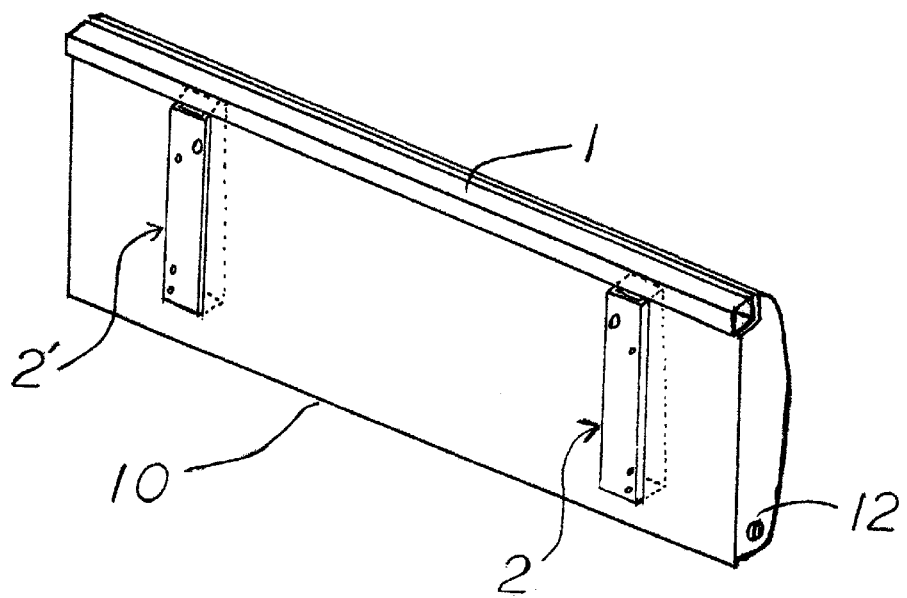
FIG. 5 is an isometric view of the tailgate extender in its fully closed position as it might appear integrated into the top of the tailgate design.

FIG. 5 shows the tailgate extender as it might appear designed into and manufactured as part of a tailgate. Item 10 is a schematic tailgate. The load-carrying bar 1, is integrated into the design of the top of the tailgate. Items 2 and 2' are the filly closed telescoping assemblies partially embedded and integrated into the structure of the tailgate. Item 12 is the pivot point for the tailgate so that it can be moved from a closed, vertical position to an open, rearward-facing position. Although preferred embodiments of the tailgate extender of the present invention have been illustrated and described, it is to be understood that the present disclosure is made by way of example and that various other embodiments are possible without departing from the subject matter coming within the scope of the following claims, which subject matter is regarded as the invention.

The embodiments of the invention in which an exclusive property or privilege is claimed are defined as follows:

1. For a truck having a body with a right side and a left side and a tailgate, said tailgate having a width, a top edge and a bottom edge and a hinge means proximate the bottom edge rendering it capable of being positioned in either a closed, vertical position or in an open, rearward-facing, horizontal position, a telescoping, multifunction tailgate extender comprising:

an elongate, load-carrying member having a length approximately equal to the width of the tailgate, positioned parallel to the top edge of the tailgate and substantially in the same plane as the tailgate;

at least one telescoping assembly comprised of at least three segments; said at least one telescoping assembly connecting said load-carrying member to said truck such that the load-carrying member may be positioned at the top edge of the tailgate or at any predetermined distance away from the top edge, up to the full extension of the telescoping assembly;

a means for keeping said load carrying member substantially in the plane of the tailgate at all predetermined extensions of the telescoping assembly, and in either the vertical or horizontal position of the tailgate.

2. The multifunction tailgate extender of claim 1 wherein said at least one telescoping assembly is attached to said tailgate thereby causing the load-carrying member to rotate from a vertical position to a rearward-facing, horizontal position as the tailgate is closed or opened.

3. The multifunction tailgate extender of claim 1 wherein said at least one telescoping assembly comprises a plurality of telescoping assemblies, with at least one telescoping assembly attached to each side of said truck body proximate both said tailgate hinge means and said tailgate bottom edge; each telescoping assembly having a hinge means to pivot from a vertical position to a rearward-facing, horizontal position; each telescoping assembly also having a means to selectively lock in either the vertical position or in the rearward-facing, horizontal position.

4. The multifunction tailgate extender of claim 3 wherein the means to selectively lock each of the telescoping assemblies in either the vertical position or in the rearward-facing, horizontal position comprises spring loaded buttons attached to the body of the truck; said buttons selectively protrude through holes in plates attached to each of the telescoping assemblies.

5. The multifunction tailgate extender of claim 1 wherein said load-carrying member has one or more means to attach and secure a pair of horizontal elongate members; said members being capable of being used as a bicycle rack.

6. The multifunction tailgate extender of claim 1 wherein said load-carrying member has an attachment point for specialty racks.

7. The multifunction tailgate extender of claim 1 wherein said at least one telescoping assembly is comprised of a plurality of segments, with a means to affix the load-carrying member at predetermined distances away from the top edge of the tailgate.

8. The at least one telescoping assembly of claim 7 wherein said segments are tubes, each tube with an upper end and a lower end, and each tube with a plurality of holes of predetermined size, situated along its length; said holes capable of being aligned to holes in adjacent tubes to allow a locking mechanism to firmly affix each segment at a predetermined distance in relation to adjacent segments.

9. The multifunction tailgate extender of claim 1 wherein said load-carrying member has a plurality of holes of a predetermined size to accept a hook of a tie-down strap, whereby cargo can be safely secured.

10. For a truck having a body with a right side and a left side and a tailgate, said tailgate having a width, a top edge and a bottom edge and a hinge means proximate the bottom edge rendering it capable of being positioned in either a closed, vertical position or in an open, rearward-facing, horizontal position, a telescoping, multifunction tailgate extender comprising:

an elongate, load-carrying member having a length approximately equal to the width of the tailgate, positioned parallel to the top edge of the tailgate and substantially in the same plane as the tailgate;

at least one telescoping assembly comprised of a plurality of segments, each segment is comprised substantially of a single, rigid member; said at least one telescoping assembly connecting said load-carrying member to said truck such that the load-carrying member may be positioned at the top edge of the tailgate or at any predetermined distance away from the top edge, up to the full extension of the telescoping assembly;

a means for keeping said load carrying member substantially in the plane of the tailgate at all predetermined extensions of the telescoping assembly, and in either the vertical or horizontal position of the tailgate.

11. The multifunction tailgate extender of claim 10 wherein said at least one telescoping assembly is attached to said tailgate thereby causing the load-carrying member to rotate from a vertical position to a rearward-facing, horizontal position as the tailgate is closed or opened.

12. The multifunction tailgate extender of claim 10 wherein said at least one telescoping assembly comprises a plurality of telescoping assemblies, with at least one telescoping assembly attached to each side of said truck body proximate both said tailgate hinge means and said tailgate bottom edge; each telescoping assembly having a hinge means to pivot from a vertical position to a rearward-facing, horizontal position; each telescoping assembly also having a means to selectively lock in either the vertical position or in the rearward-facing, horizontal position.

13. The multifunction tailgate extender of claim 12 wherein the means to selectively lock each of the telescoping assemblies in either the vertical position or in the rearward-facing, horizontal position comprises spring loaded buttons attached to the body of the truck; said buttons selectively protrude through holes in plates attached to each of the telescoping assemblies.

14. The multifunction tailgate extender of claim 10 wherein said load-carrying member has one or more means to attach and secure a pair of horizontal elongate members; said members being capable of being used as a bicycle rack.

15. The multifunction tailgate extender of claim 10 wherein said load-carrying member has an attachment point for specialty racks.

16. The multifunction tailgate extender of claim 10 wherein said at least one telescoping assembly is comprised of a plurality of segments, with a means to affix the load-carrying member at predetermined distances away from the top edge of the tailgate.

17. The at least one telescoping assembly of claim 16 wherein said segments are tubes, each tube with an upper end and a lower end, and each tube with a plurality of holes of predetermined size, situated along its length; said holes capable of being aligned to holes in adjacent tubes to allow a locking mechanism to firmly affix each segment at a predetermined distance in relation to adjacent segments.

18. The multifunction tailgate extender of claim 10 wherein said load-carrying member has a plurality of holes of a predetermined size to accept a hook of a tie-down strap, whereby cargo can be safely secured.

* * * * *